(12) United States Patent
Ohashi

(10) Patent No.: US 10,264,658 B2
(45) Date of Patent: Apr. 16, 2019

(54) LIGHTING DEVICE

(71) Applicant: Yazaki Corporation, Tokyo (JP)

(72) Inventor: Tomonori Ohashi, Makinohara (JP)

(73) Assignee: YAZAKI CORPORATION, Minato-Ku, Tokyo (JP)

(*) Notice: Subject to any disclaimer, the term of this patent is extended or adjusted under 35 U.S.C. 154(b) by 0 days.

(21) Appl. No.: 16/003,244

(22) Filed: Jun. 8, 2018

(65) Prior Publication Data

US 2019/0053359 A1     Feb. 14, 2019

(30) Foreign Application Priority Data

Aug. 10, 2017 (JP) ................ 2017-155178

(51) Int. Cl.
| | |
|---|---|
| H05B 33/08 | (2006.01) |
| H05B 37/02 | (2006.01) |
| B60Q 3/16 | (2017.01) |
| B60W 50/04 | (2006.01) |

(52) U.S. Cl.
CPC ......... *H05B 37/0281* (2013.01); *B60W 50/04* (2013.01); *H05B 33/0845* (2013.01); *H05B 33/0857* (2013.01)

(58) Field of Classification Search
CPC ............... H05B 33/08; H05B 33/0845; H05B 33/0857; H05B 33/0866; H05B 33/0863; H05B 37/02; H05B 37/0227; H05B 37/0281; B60Q 3/16; B60Q 3/18
See application file for complete search history.

(56) References Cited

U.S. PATENT DOCUMENTS 9,420,671 B1*  8/2016  Sugimoto .......... H05B 37/0281
2017/0118816 A1*  4/2017  Ohashi .............. H05B 33/0827
2017/0290127 A1  10/2017  Shigezane et al.

FOREIGN PATENT DOCUMENTS

| JP | 2013-069448 A | 4/2013 |
|---|---|---|
| JP | 2016-126868 A | 7/2016 |

* cited by examiner

*Primary Examiner* — Thai Pham
(74) *Attorney, Agent, or Firm* — Sughrue Mion, PLLC

(57) ABSTRACT

A lighting device which can produce various fade operations without significantly consuming memory capacity is provided. Duty ratios for a plurality of steps are recorded in a ROM of a slave ECU. The slave ECU sets an interval time for 1 step, reads out from a map brightness of a next step at each set interval time, and outputs a pulse with the read out duty ratio to a LED. A change duty ratio, a pre-change interval time and a post-change interval time are recorded in the ROM. The slave ECU sets the interval time for 1 step to the pre-change interval time before the duty ratio of the LED reaches to the change duty ratio, and changes the setting by setting the interval time for 1 step to the post-change interval time after the duty ratio of the LED has reached to the change duty ratio.

4 Claims, 5 Drawing Sheets

LIGHTING DEVICE

CROSS REFERENCE TO RELATED APPLICATION

The priority application Japanese Patent Application No. 2017-155178 upon which this patent application is based is hereby incorporated by reference.

BACKGROUND

Field of the Invention

The present disclosure relates to a lighting device.

Description of the Related Art

For example, a lighting device mounted on a vehicle executes a fade operation in which brightness of a light is gradually increased to put the light on, or the brightness is gradually decreased to put the light out. Such lighting device has a map defining a duty value (i.e., brightness) according to time, and controls the brightness in accordance with the map (for example, refer to Japan Patent Application Publication No. 2016-126868 and Japan Patent Application Publication No. 2013-69448).

SUMMARY OF THE INVENTION

However, the conventional lighting device has a drawback that, if several variations of the fade operation are desired, many maps must be prepared for each variation, thus the memory capacity is consumed significantly.

An object of the present invention is to provide a lighting device which can produce various fade operations without significantly consuming the memory capacity.

To achieve the above-mentioned object, the present invention provides A lighting device for adjusting brightness of a light source including a first recording part in which a map indicative of brightness and change in brightness with respect to a plurality of steps is recorded, a set part configured to set an interval time for 1 step, a control part configured to read out from the map the brightness for next step at each set interval time, and allow the light source to emit light with the read out brightness, and a second recording part in which a change brightness, a pre-change interval time and a post-change interval time corresponding to the change brightness are recorded, wherein the set part sets the interval time for 1 step to the pre-change interval time before the brightness of the light source reaches to the change brightness, and the set part changes the setting by setting the interval time for 1 step to the post-change interval time after the brightness of the light source has reached to the change brightness.

Further, a last brightness may be further recorded in the second recording part, and the control part may maintain the last brightness after the brightness of the light source has reached to the last brightness.

Further, the change brightness, the pre-change interval time and the post-change interval time corresponding to a plurality of variations may be recorded in the second recording part, and the set part may set the interval time for 1 step according to the change brightness, the pre-change interval time and the post-change interval time corresponding to one of the plurality of variations.

Further, the lighting device may further include a slave device having the first recording part, the set part and the control part, and a master device communicable with the slave device and having the second recording part, wherein the master device may transmit a control signal to the slave device, the control signal including the change brightness and the pre-change interval time corresponding to the change brightness, wherein, in accordance with reception of the control signal, the set part of the slave device may set the interval time for 1 step to the pre-change interval time until the brightness of the light source reaches to the change brightness received from the master device, wherein the master device may transmit a next control signal to the slave device after the transmitting of the control signal and before the brightness of the light source reaches to the change brightness, the next control signal including the post-change interval time corresponding to the change brightness, and wherein, after the brightness of the light source has reached to the change brightness, the set part of the slave device may change the setting by setting the interval time for 1 step to the post-change interval time received from the master device, according to the reception of the next control signal.

According to the present invention described above, the lighting device can produce various fade operations while preventing significantly consuming the memory capacity.

DETAILED DESCRIPTION OF EXEMPLARY EMBODIMENT OF THE INVENTION

First Embodiment

Figure 1:
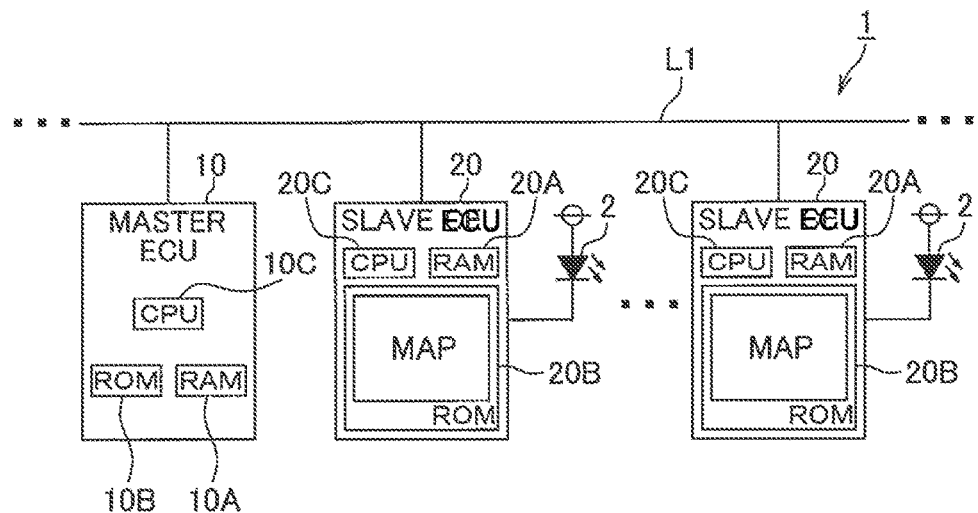
FIG. 1 is a schematic diagram of one embodiment of a lighting system having a lighting device of the present invention.

The following will explain a first embodiment of the present invention in reference to FIG. 1. FIG. 1 is a schematic diagram of one embodiment of a lighting system having a lighting device of the present invention. A lighting system 1 shown in FIG. 1 is mounted on a vehicle such as a passenger vehicle, and is used to control various lights in a vehicle interior.

The lighting system 1 includes one master ECU 10 and a plurality of slave ECUs (lighting devices) 20 configured to control LEDs 2 (light sources) in accordance with a control signal from the master ECU 10. The master ECU 10 and the plurality of slave ECUs 20 are connected to each other via a communication line L1, and are allowed to communicate with each other via the communication line L1.

Each of the master ECU 10 and the slave ECU 20 includes a CPU (Central Processing Unit) 10C, 20C having a memory such as a RAM (Random Access Memory) 10A, 20A and a ROM (Read Only Memory) 10B, 20B, for example.

The CPU 10C of the master ECU 10 (hereinafter, just called "master ECU 10") monitors states of various switches on the vehicle that can be operated by a user (such as a driver) and various sensors for detecting various states, and transmits a control signal to the slave ECU 20 based on information input from an upstream ECU not shown.

The CPU 20C of the slave ECU 20 (hereinafter, just called "slave ECU 20") controls putting on and putting out of the LED 2. The slave ECU 20 utilizes a PWM (Pulse Width Modulation) technique in which the slave ECU 20 outputs a pulse to the LED 2 to allow the LED 2 to emit light with the brightness corresponding to the duty ratio of the pulse.

Figure 2:
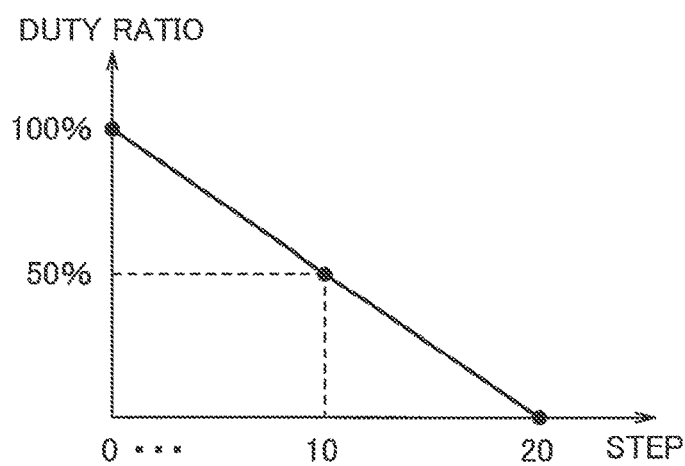
FIG. 2 shows a map recorded in a slave ECU of FIG. 1.

In the ROM 20B as a first recording part of the slave ECU 20, only one map is recorded. The map indicates the duty ratios (brightness) with respect to a plurality of steps, as shown in FIG. 2. The recorded map in this embodiment is a map for fade-out, in which the duty ratio decreases with an increase in the number of steps.

Further, a change duty ratio (reference brightness), D1, a pre-change interval time (interval time before change), T1, a post-change interval time (interval time after change), T2, and a last duty ratio (last brightness), DL, with respect to each of the plurality of variations, V1 through Vn (n is any integer), as shown in Table 1 indicated below, are recorded in the ROM 20B as a second recording part of the slave ECU 20.

TABLE 1

| Variations | T1 | D1 | T2 | DL |
|---|---|---|---|---|
| V1 | ○○ | ○○ | ○○ | ○○ |
| . | . | . | . | . |
| . | . | . | . | . |
| . | . | . | . | . |
| Vn | XX | XX | XX | XX |

Next, the operation of the lighting system 1 described above is explained below. Firstly, a fade-out processing is explained in reference to the flowchart of FIG. 3. The master ECU 10, when it determines that a predetermined LED 2 needs to be operated in the fade-out operation with a variation Vm (m is any integer between 1 through n), transmits a control signal indicating that task to the slave ECU 20 which controls the predetermined LED.

The control signal transmitted by the master ECU 10 contains information of the variation Vm and an indication to execute the fade-out operation. The master ECU 10 makes the above-mentioned determination based on the states of the various switches or the various sensors and the information input from the upstream ECU.

Figure 3:
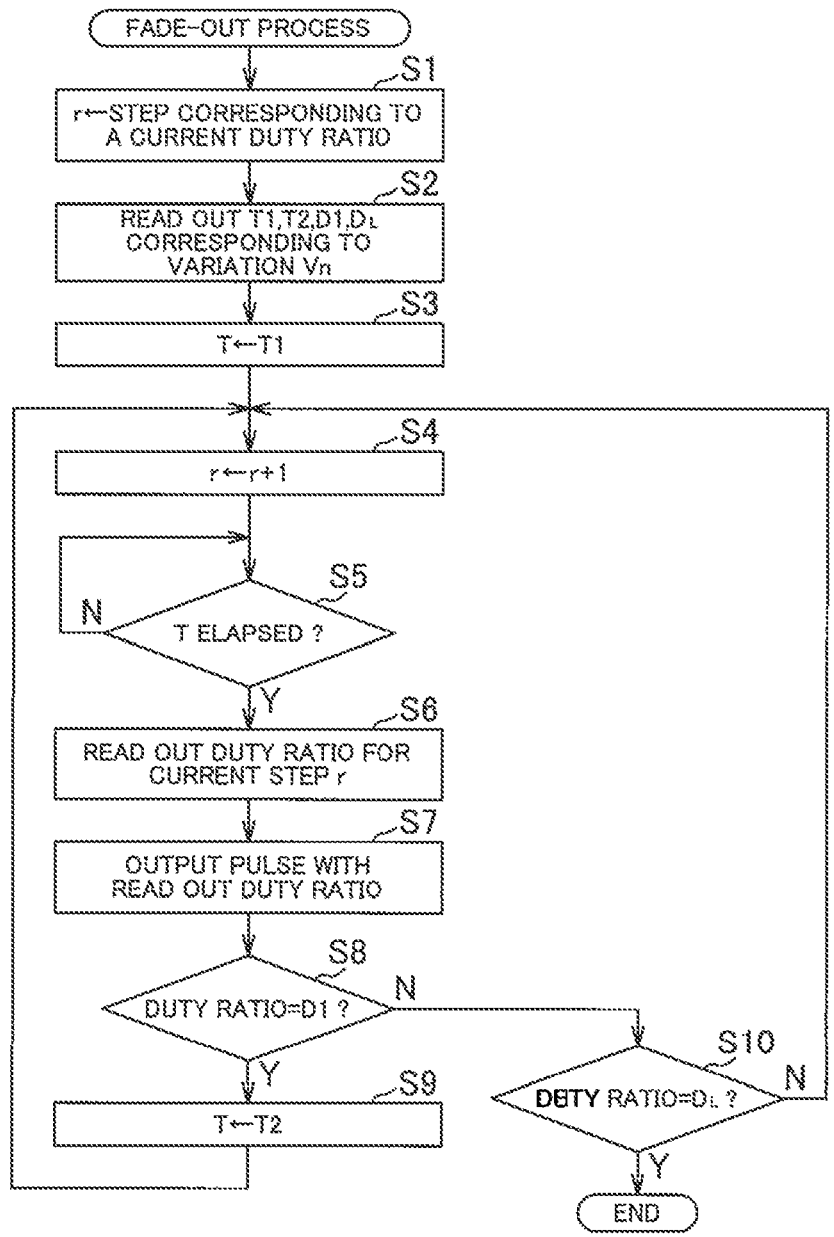
FIG. 3 is a flowchart showing one example of a fade-out procedure of the slave ECU of FIG. 1 according to a first embodiment.

The slave ECU 20, when it receives the control signal addresses to itself, executes the fade-out process shown in FIG. 3. In the fade-out process, the slave ECU 20 determines a step corresponding to a current duty ratio from the map, and assigns the determined step as a current step r (Step S1). For example, if the current duty ratio is 100%, then the slave ECU 20 assigns the step "0" as the current step number r. Next, the slave ECU 20 reads out the interval times T1, T2, the change duty ratio D1 and the last duty ratio DL corresponding to the variation Vm (Step S2).

Subsequently, the CPU 20C of the slave ECU 20 functions as a set part setting the interval time T1 as an interval time for 1 step T (Step S3). Next, the slave ECU 20 increments the current step r (Step S4), and then waits until the interval time T elapses (Step S5). After the interval time T has elapsed (i.e., "Y" in Step S5), the slave ECU 20 reads out the duty ratio corresponding to the current step r from the map (Step S6), and outputs the pulse with the read out duty ratio to the LED 2 (Step S7). In the steps S5 through S7 described above, the CPU 20C of the slave ECU 20 functions as a control part.

Further, if the duty ratio of the pulse output in Step S7 has not reached to the change duty ratio D1 or the last duty ratio DL (i.e., "N" in Step S8 and "N" in Step S10), the slave ECU 20 returns to Step S4 without changing the interval time T. In this manner, the slave ECU 20 continues the duty ratio control with the interval time for 1 step T=T1.

If the duty ratio of the pulse output in Step S7 has reached to the change duty ratio D1 (i.e., "Y" in Step S8), the CPU 20C of the slave ECU 20 functions as a set part and sets the interval time T2 as the interval time T for 1 step (Step S9), and subsequently returns to step S4. In this manner, the interval time T is changed from interval time T1 to interval time T2.

Subsequently, if the duty ratio of the pulse output in Step S7 has reached to the last duty ratio DL (i.e., "Y" in Step S10), the slave ECU 20 finishes the fade-out process. In this manner, the control of the LED 2 at the last duty ratio DL is maintained. If the last duty ratio DL is 0, then the put out of the LED 2 is maintained.

In the following, a specific example of the above-described fade-out process is explained in reference to FIG. 2 and FIG. 4. For example, assume that for the variation Vm, the corresponding change duty ratio is 50%, the corresponding interval time is T1=20 ms, and the corresponding interval time is T2=60 ms. Assume that the current duty ratio is 100%. The map is set such that the duty ratio corresponding to the step "0" is 100% as shown in FIG. 2, for example. The map is set such that the duty ratio decreases with an increase in the step, with the duty ratio corresponding to the step "10" is 50%, and the duty ratio corresponding to the step "20" is 0%.

In this case, until the duty ratio reaches to the change duty ratio 50% from the current duty ratio 100%, the slave ECU 20 executes the fade-out process with the interval time T for 1 step (i.e., for each step) set to the interval time T1=20 ms. As a result, the slave ECU 20 reduces the duty ratio from 100% to 50% over 200 ms, as shown in FIG. 4. Once the duty ratio reaches to the change duty ratio 50%, the slave ECU 20 sets the interval time T of 1 step to the interval time T2=60 ms.

Until the duty ratio reaches to the last duty ratio, the slave ECU 20 maintains the interval time T for 1 step at the interval time T2=60 ms. As a result, the slave ECU 20 reduces the duty ratio from 50% to the last duty ratio 0% over 600 ms.

Consequently, the slave ECU 20 can control the LED 2 such that the duty ratio is reduced rapidly at the beginning, and then once the duty ratio reaches to 50%, the duty ratio is reduced slowly.

Next, assume that for another variation, the corresponding change duty ratio is 50%, the corresponding interval time is T1=60 ms, and the corresponding interval time is T2=20 ms.

Figure 5:
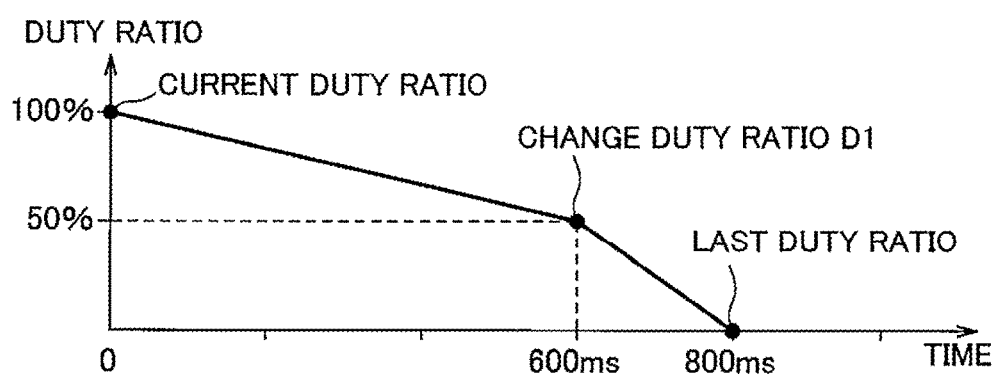
FIG. 5 is a graph showing a relationship between a duty ratio to be output to a LED and an elapsed time at another variation.

In this case, until the duty ratio reaches to the change duty ratio 50% from the current duty ratio 100%, the slave ECU 20 executes the fade-out process with the interval time T for 1 step (i.e., for each step) set to the interval time T1=60 ms. As a result, the slave ECU 20 reduces the duty ratio from 100% to 50% over 600 ms, as shown in FIG. 5. Once the duty ratio reaches to the change duty ratio 50%, the slave ECU 20 sets the interval time T for 1 step to the interval time T2=20 ms. Until the duty ratio reaches to the last duty ratio, the slave ECU 20 maintains the interval time T for 1 step at the interval time T2=20 ms. As a result, the slave ECU 20 reduces the duty ratio from 50% to the last duty ratio 0% over 200 ms.

Consequently, the slave ECU 20 can control the LED 2 such that the duty ratio is reduced slowly at the beginning, and then once the duty ratio reaches to 50%, the duty ratio is reduced rapidly.

Figure 4:
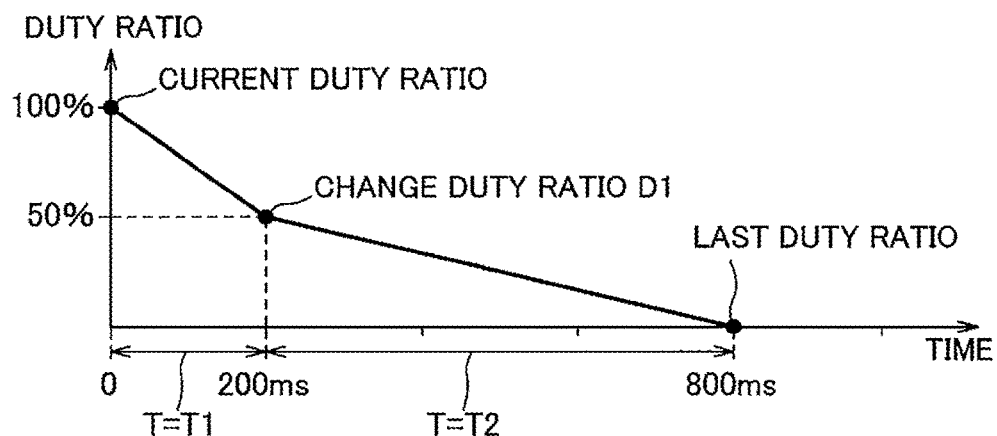
FIG. 4 is a graph showing a relationship between a duty ratio to be output to a LED and an elapsed time at a variation "m"

As described above, the slave ECU 20 can execute the fade-out operation of the plurality of variations as shown in FIG. 4 and FIG. 5 using one map shown in FIG. 2.

Next, the fade-in process is explained below in reference to the flowchart of FIG. 6. The master ECU 10, when it determines that a predetermined LED 2 needs to be operated in the fade-in operation with a variation Vm (m is any integer between 1 through n), transmits a control signal indicating that task to the slave ECU 20 which controls the predetermined LED 2.

Figure 6:
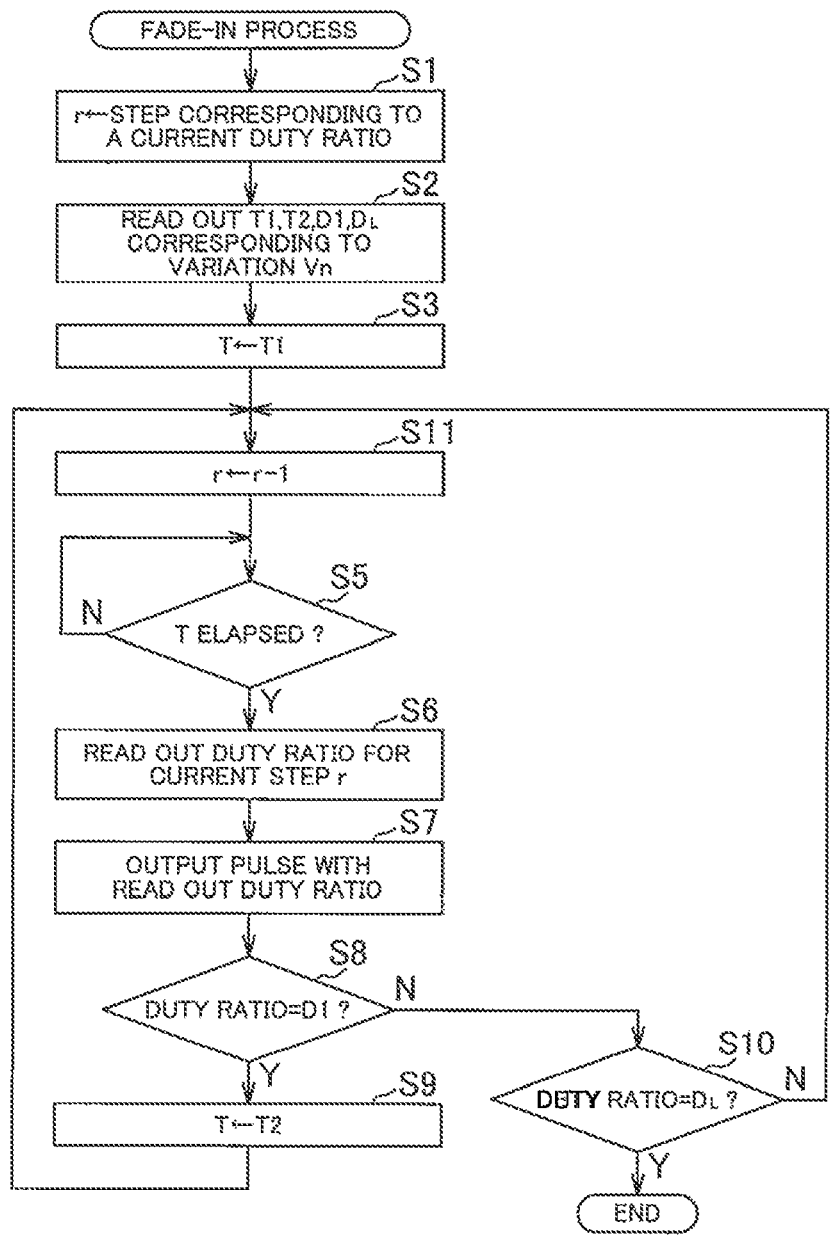
FIG. 6 is a flowchart showing one example of a fade-in process of the slave ECU of FIG. 1 according to a first embodiment.

The slave ECU 20, when it receives the control signal addresses to itself, executes the fade-in process shown in FIG. 6. In FIG. 6, the process or the step similar to that of FIG. 3 is indicated with the same reference sign as FIG. 3 to omit the detailed explanation thereof. In the fade-in process, the slave ECU 20 determines a step corresponding to a current duty ratio from the map, and assigns the determined step as a current step r (Step S1). For example, if the current duty ratio is 0%, then the slave ECU 20 assigns the step "20" as the current step r. Next, the slave ECU 20 executes Step S2 and Step S3 in a manner similar to the above-described fade-out process.

Subsequently, the slave ECU 20 decrements the current step r (Step S11), and subsequently executes Step S2 through Step S10 similar to those of the above-described fade-out process. By only decrementing in Step S11, the fade-in and the fade-out processes can be executed using one map.

According to the above-described embodiment, the change duty ratio D1 and the interval times T1, T2 are recorded in the ROM 20B of the slave ECU 20. Further, the slave ECU 20 sets the interval time T1 as the interval time T for 1 step before the brightness of the LED 2 reaches to the change duty ratio D1, and changes the setting by setting the interval time T2 as the interval time T for 1 step after the duty ratio has reached to the change duty ratio D1.

Consequently, by providing the variations V1 through Vm for the change duty ratio D1 and the interval times T1, T2 as shown in FIG. 2, the slave ECU 20 can perform the fade operations with many variations V1 through Vm with one map. Thus, it is not necessary to record the map for each variation, thereby reducing the consumption of the memory capacity while producing the fade operations with many variations. Further, since the consumption of the memory capacity can be reduced, a low cost memory with small memory capacity can be used.

Furthermore, according to the above-described embodiment, the last duty ratio DL is recorded in the ROM 20B of the slave ECU 20. Thus, the slave ECU 20 can maintain the last duty ratio DL when the duty ratio has reached to the last duty ratio DL.

According to the above-described embodiment, only one change duty ratio D1 is recorded for each of the variations V1 through Vn. However, the present invention is not limited to this. As shown in Table 2 indicated below, the plurality of change duty ratios D1 through Dp (p is any integer more than 1) and the interval times T1 through Tp+1 corresponding to the plurality of change duty ratios D1-Dp may be recorded.

TABLE 2

| Variations | T1 | D1 | T2 | ... | $T_q$ | $D_q$ | $T_{q+1}$ | ... | $T_{p+1}$ | $D_L$ |
|---|---|---|---|---|---|---|---|---|---|---|
| V1 | ○○ | ○○ | ○○ | — | — | — | — | — | — | ○○ |
| V2 | △△ | △△ | △△ |  | △△ | △△ | △△ |  | — | △△ |
| . |  |  |  |  |  |  |  |  |  |  |
| . |  |  |  |  |  |  |  |  |  |  |
| Vm | ○○ | ○○ | ○○ |  | ○○ | ○○ | ○○ | — | — | ○○ |
| . |  |  |  |  |  |  |  |  |  |  |
| . |  |  |  |  |  |  |  |  |  |  |
| Vn | XX | XX | XX |  | XX | XX | XX |  | XX | XX |

In this case, the interval time Tq (q is any integer between 1 and p+1) corresponds to the pre-change interval time (interval time before change) with respect to the change duty ratio Dq, and the interval time Tq+1 corresponds to the post-change interval time (interval time after change) with respect to the change duty ratio Dq. Further, in this case, it is not necessary to record p (p is the number of change duty ratios) change duty ratios for all of the variations V1 through Vn, the number of the change duty ratios may be any of 1 through p. For example, for the variation V1, only one change duty ratio D1 may be recorded, and the areas for recording the change duty ratios D2 through Dp and the interval times T3 through Tp+1 may be set blank.

In this case also, the slave ECU 20 changes the interval time T each time the duty ratio reaches to the change duty ratio D1 through Dp, and repeats this until the duty ratio reaches to the last duty ratio DL.

Further, according to the above-described embodiment, the slave ECU 20 executed the fade-in process using the map for fade-out. However, the present invention is not limited to this. For example, two maps arranged for fade-in and fade-out, respectively, may be recorded, and the slave ECU 20 may execute the fade-in process using the map for fade-in and may execute the fade-out process using the map for fade-out.

Second Embodiment

The following will explain a lighting system according to a second embodiment. The configuration of the lighting system of the second embodiment is similar to that of the first embodiment shown in FIG. 1, thus the detailed explanation thereof is omitted herein. In the first embodiment, the change duty ratio D1 and the interval times T1, T2 corresponding to the respective variations V1 through Vn shown in Table 1 are recorded in the ROM 20B of the slave ECU 20, however in the second embodiment they are recorded in the ROM 10B of the master ECU 10. That is, in the second embodiment, the master ECU 10 constitutes the master device, the slave ECU 20 constitutes the slave device, and the lighting system 1 constitutes the lighting device.

Next, the operation of the lighting system 1 having the above-described constitution is explained below in reference to FIG. 7 and FIG. 8.

Figure 7:
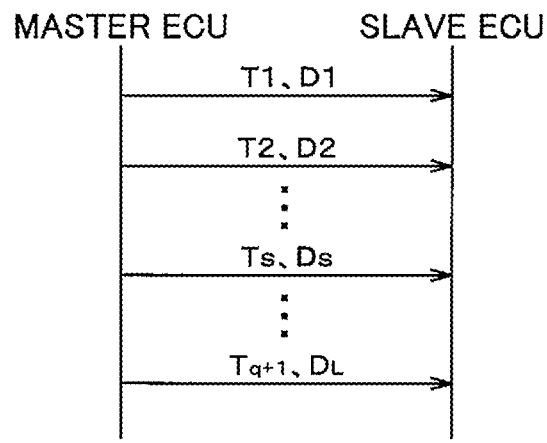
FIG. 7 illustrates a communication between a master ECU and a slave ECU according to a second embodiment.

The master ECU 10, when it determines that a predetermined LED 2 needs to be operated in the fade-out operation with a variation Vm, transmits a control signal including the interval time T1 and the change duty ratio D1 for the variation Vm, as shown in FIG. 7. In this embodiment, q change duty ratios D1 through Dq (i.e., the number of change duty ratios is q) are stored for the variation Vm, as shown in Table 2.

Figure 8:
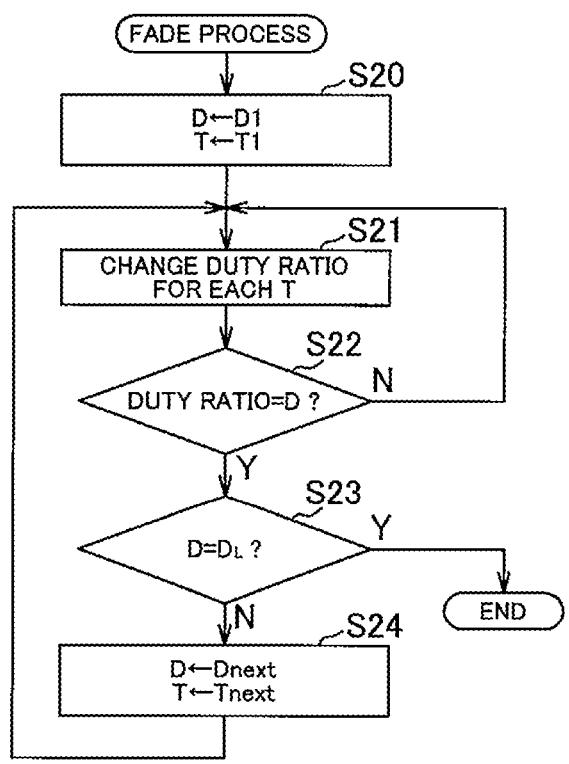
FIG. 8 is a flowchart showing one example of a fade process of the slave ECU according to the second embodiment.

The slave ECU 20 executes the fade process shown in FIG. 8 in accordance with the reception of the interval time T1 and the change duty ratio D1. In the fade process, the slave ECU 20 sets the interval time T for each step to the received interval time T1, and sets the duty ratio D to the received change duty ratio D1 (Step S20). Subsequently, the slave ECU 20 changes (i.e., increments or decrements) the duty ratio for each interval time T according to the map (Step S21) until the duty ratio reaches to the duty ratio D ("N" in Step S22).

The master ECU 10, before the duty ratio reaches to the change duty ratio D1 transmitted in the previous control signal, transmits the control signal including the next interval time T2 and the change duty ratio D2, as shown in FIG. 7. Similarly, the master ECU 10, before the duty ratio reaches to the change duty ratio Ds−1 (s is any integer between 2 and q) transmitted in the previous control signal, sequentially transmits the control signal including the next interval time Ts and the change duty ratio Ds. Lastly, the master ECU 10 transmits the control signal including the interval time Tq+1 and the last duty ratio DL.

The slave ECU 20 executes a reception process in parallel with the above-described fade process, in which, when the above-described control signal is received, it temporally stores in the RAM 20A the received interval time and the duty ratio as a standby interval time $T_{next}$ and a standby duty ratio $D_{next}$. In the fade process, if the duty ratio has reached to the duty ratio D ("Y" in Step S22) and the last duty ratio DL is not set as the duty ratio D ("N" in Step S23), the slave ECU 20 sets the standby interval time $T_{next}$ as the interval time T and the standby duty ratio $D_{next}$ as the duty ratio D (Step S24), and repeats the operation of Step S21.

If the duty ratio has reached to the duty ratio D ("Y" in Step S22) and the last duty ratio DL is set as the duty ratio D ("Y" in Step S23), the slave ECU 20 immediately finishes the process and maintains the last duty ratio.

In the example shown in Table 2, in case of a batch transmission of all of the change duty ratios D1 through Dp, DL and the interval times T1 through Tp+1, the control signal is required to have a data length capable of transmitting P+1 change/last duty ratios and P+1 interval times. However, some of the variations only include one change duty ratio (e.g., the variation V1), so in this case the data length for storing the duty ratios D2 through Dp and the interval times T3 through Tp+1 is unnecessarily long, decreasing the communication efficiency.

According to the second embodiment described above, one control signal only includes one duty ratio and one interval time, and it is not necessary to make the data length of the control signal unnecessarily long, thus the communication efficiency can be improved. Moreover, since the next change duty ratio and the next interval time are transmitted before the duty ratio reaches to the change duty ratio, the interval time can be changed immediately after the duty ratio has reached the change duty ratio.

The present invention is not limited to the embodiments described above. That is, various modifications and changes may be made without departing from the scope and spirit of the present invention.

LIST OF REFERENCE SIGNS 1 lighting system (lighting device)
2 LED (light source)
10 master ECU (master device)
10B ROM (second recording part)
20 slave ECU (lighting device, slave device)
20B ROM (first recording part, second recording part)
20C CPU (set part, control part)

What is claimed is:

1. A lighting device for adjusting brightness of a light source comprising:
a first recording part in which a map indicative of brightness and change in brightness with respect to a plurality of steps is recorded,
a second recording part in which a plurality of combinations of information is recorded, each combination of information including a reference brightness, a pre-change interval time and a post-change interval time corresponding to the reference brightness,
a set part configured to set, as an interval time for 1 step, the pre-change interval time and the post-change interval time corresponding to one of the plurality of combinations of information recorded in the second recording part, and
a control part configured to read out from the map recorded in the first recording part the brightness for next step at each set interval time, and allow the light source to emit light with the read out brightness,
wherein the set part sets the interval time for 1 step to the pre-change interval time before the brightness of the light source reaches to the reference brightness, and the set part changes the setting by setting the interval time for 1 step to the post-change interval time after the brightness of the light source has reached to the reference brightness.

2. The lighting device according to claim 1, wherein
a last brightness is further included in each of the combinations of information recorded in the second recording part, and
the control part maintains the last brightness after the brightness of the light source has reached to the last brightness.

3. The lighting device according to claim 1, further comprising
a slave device having the first recording part, the set part and the control part, and
a master device communicable with the slave device and having the second recording part,
wherein the master device transmits a control signal to the slave device, the control signal including the reference brightness and the pre-change interval time corresponding to the reference brightness,
wherein, in accordance with reception of the control signal, the set part of the slave device sets the interval time for 1 step to the pre-change interval time until the brightness of the light source reaches to the reference brightness received from the master device,
wherein the master device transmits a next control signal to the slave device after the transmitting of the control signal and before the brightness of the light source reaches to the reference brightness, the next control signal including the post-change interval time corresponding to the reference brightness, and
wherein, after the brightness of the light source has reached to the reference brightness, the set part of the slave device changes the setting by setting the interval time for 1 step to the post-change interval time received from the master device, according to the reception of the next control signal.

4. The lighting device according to claim 2, further comprising
- a slave device having the first recording part, the set part and the control part, and
- a master device communicable with the slave device and having the second recording part,
- wherein the master device transmits a control signal to the slave device, the control signal including the reference brightness and the pre-change interval time corresponding to the reference brightness,
- wherein, in accordance with reception of the control signal, the set part of the slave device sets the interval time for 1 step to the pre-change interval time until the brightness of the light source reaches to the reference brightness received from the master device,
- wherein the master device transmits a next control signal to the slave device after the transmitting of the control signal and before the brightness of the light source reaches to the reference brightness, the next control signal including the post-change interval time corresponding to the reference brightness, and
- wherein, after the brightness of the light source has reached to the reference brightness, the set part of the slave device changes the setting by setting the interval time for 1 step to the post-change interval time received from the master device, according to the reception of the next control signal.

* * * * *